United States Patent [19]

Sakata et al.

[11] 4,420,887
[45] Dec. 20, 1983

[54] INSTRUMENT FOR MEASURING A LENGTH

[75] Inventors: Hideo Sakata; Ichiro Mizuno; Masao Nakahara; Takasi Sanpei, all of Kawasaki, Japan

[73] Assignee: Mitutoyo Mfg. Co., Ltd., Tokyo, Japan

[21] Appl. No.: 397,942

[22] Filed: Jul. 13, 1982

[30] Foreign Application Priority Data

Jul. 21, 1981 [JP] Japan .................... 56-108515[U]
Nov. 21, 1981 [JP] Japan .................... 56-187350

[51] Int. Cl.³ ............................................. G01B 5/00
[52] U.S. Cl. .................................................. 33/147 F
[58] Field of Search ............ 33/143 R, 143 M, 143 J, 33/143 K, 147 R, 147 F, 147 H, 163, 164, 165, 166

[56] References Cited

U.S. PATENT DOCUMENTS 2,952,916 9/1960 Germann ........................... 33/143 I
3,060,584 10/1962 Westfall ............................. 33/143 K

FOREIGN PATENT DOCUMENTS 696947 9/1953 United Kingdom .............. 33/147 F

Primary Examiner—Harry N. Haroian
Attorney, Agent, or Firm—Flynn, Thiel, Boutell & Tanis

[57] ABSTRACT

A micrometer wherein a rotary knob and a pinion are threadably coupled to each other, further, a resilient member for functioning as a constant pressure is interposed between the rotary knob and the pinion, and, when the rotary knob is rotated by a value of distortion of the resilient member after a spindle having a rack meshed with the pinion is abutted against a workpiece to be measured and stopped, the rotary knob is moved in a direction of the rotary shaft thereof, whereby a portion of the rotary knob is abutted against a main frame, thereby acting as a locking function.

9 Claims, 15 Drawing Figures

INSTRUMENT FOR MEASURING A LENGTH

BACKGROUND OF THE INVENTION

1. Field of the Invention

This invention relates to instruments for measuring a length, and more particularly to an instrument for measuring a length of a workpiece to be measured from a value of displacement in the axial direction of a spindle.

2. Description of the Prior Art

Heretofore, there have been developed instruments for measuring a length of various types, including a very common one, a so-called thread micrometer, in which internal threads are formed with precision on an inner sleeve solidly secured to a main frame, external threads of a spindle also formed with precision are threadably coupled to the internal threads, and a thimble integrally affixed to this spindle is rotated to thereby measure a length of the workpiece. The instrument for measuring a length of the type described can offer such advantages that the internal mechanism including the threads, having a substantially hermetically closed construction, is high in dust excluding properties, the spindle is not freely rotated due to a self-locking action of the threads even if a measurer releases his hand from the thimble, so that the workpiece can be reliably maintained in a clamped state.

On the other hand, the instrument for measuring a length of the type described presents such disadvantages that, since the pitches of the threads are as minute as about 0.5 mm in general, the value of bite of the threads, i.e., the threadably coupled position of the threads is varied and hence the measuring accuracy is not stabilized depending on the value of a thimble operating force when zero point is set or the workpiece to be measured is clamped, thus requiring a high skill level in measuring operation. Additionally, since the pitches of the threads are so minute as described above, the spindle cannot be transferred at high speed, and hence, particularly, the working efficiency of repeated measuring operation is low, and moreover, there is such a complicated measuring work requiring for reading graduations and verniers formed on an outer sleeve coupled to the inner sleeve and the thimble. Further, no operation at high speed can be effected as described above, and moreover, the spindle is directly threaded, and hence, the spindle is rotated in measuring operation, whereby, at the time of measuring a material high in flexibility, such as a soft plastics plate, wrinkles and the like are caused to the workpiece made of such a material as described above. Hence, the instrument for measuring a length of the type described is not suitable for measuring the workpieces made of the material as described above, and further, is not suitable for one-hand operation because the thimble moves in the axial direction of the spindle while rotating in measuring operation. Furthermore, such a disadvantage is presented that the instrument for measuring a length is high in production cost because finishing work with high accuracy is required for threading and graduation forming.

Further, there has been known a thread type linear instrument for measuring a length, in which the spindle is transferred linearly while not rotating with the screw-feed being still adopted. In this linear type instrument for measuring a length, an intermediate cylindrical member is rotatably and axially non-slidably mounted onto the outer periphery of the spindle and precision threads formed on the outer periphery of this intermediate cylindrical member are threadably coupled to threads formed on an inner sleeve, whereby, although improvements are made in its linearity, other disadvantages are not obviated, and moreover, such a new problem in production has been presented that the intermediate cylindrical member must be assembled and adjusted between the spindle and the inner sleeve in a manner to be parallel and coaxiall therewith.

For the purpose of attaining high speed operation, there has been proposed a linear type instrument for measuring a length, in which a pinion of a rotary knob rotatably supported on a main frame is meshed with a rack formed on a spindle, and this rotary knob is rotated so as to transfer the spindle at high speed.

The linear type instrument for measuring a length as described above should necessarily have the advantages of the high speed operation and nonrotatableness of the spindle. However, if one hand is released when the workpiece to be measured is clamped, then the spindle automatically moves in a direction of being separated from the workpiece, and hence, a necessity is created for a separately provided position holding device for preventing the spindle from being relieved, i.e., a so-called locking device. In connection with the above, a constant pressure device must be provided because it is difficult to lock the spindle in predetermined position, and moreover, releasing means for the above-described locking device should have been added.

SUMMARY OF THE INVENTION

The present invention has as its object the provision of a instrument for measuring a length provided thereon with a constant pressure locking device high in controllability.

To achieve the above-described object, the present invention contemplates that a resilient member having a function of rendering a constant pressure is interposed between a rotary knob and a pinion of a rotary knob type instrument for measuring a length, and the rotary knob and the pinion are threadably coupled with each other, whereby, after the spindle having a rack has abutted against the workpiece to stop thereat, if the rotary knob is rotated by a value commensurate to distortion of the resilient member, then the rotary knob is moved in a direction of the rotary axis, whereby a portion of the rotary knob abuts against the main frame and acts thereon as a locking function.

DETAILED DESCRIPTION OF THE PREFERRED EMBODIMENTS

Figure 1:
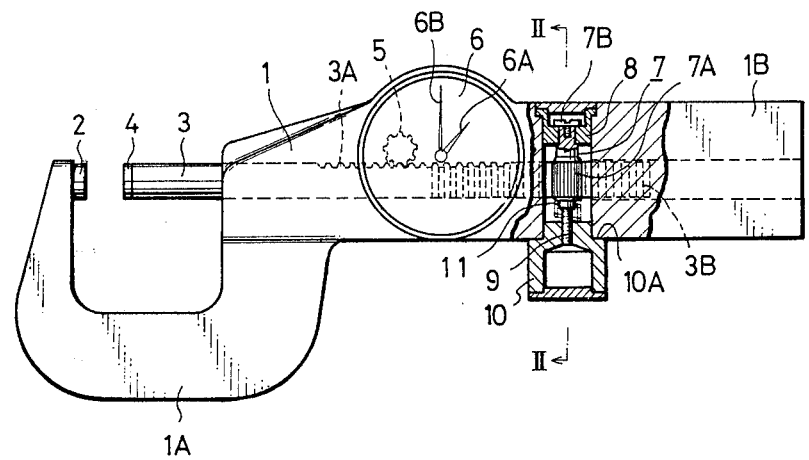
FIG. 1 is a partially cut-away front view showing a first embodiment of the instrument for measuring a length according to the present invention, which is applied to a micrometer.
Figure 2:
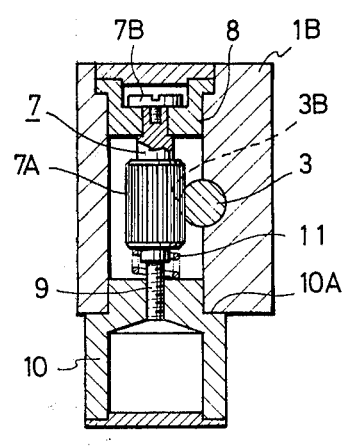
FIG. 2 is a enlarged sectional view taken along the line II—II in FIG. 1.

FIGS. 1 and 2 show the first embodiment of the instrument for measuring a length according to the present invention, which is applied to a micrometer. In FIG. 1, one end of a main frame 1 is formed into a U shape, and an anvil 2 is affixed to the inner surface of one side of an opening of this U-shaped portion 1A. The other end of this main frame 1 is hollow and linearly extends outwardly from the other side of the opening of the U-shaped portion 1A, and a spindle 3 is slidably inserted through this hollow linear portion 1B. An ultra high hardness tip 4 capable of abutting against the anvil 2 is integrally affixed to one end of the spindle 3 and the spindle 3 is formed at the intermediate peripheral surface thereof with a rack 3A finished with precision over a predetermined range in the axial direction. Meshed with this rack 3A is a pinion 5, to which is connected a dial gauge 6 as being an indicating device through an interlocking gear mechanism, not shown. This dial gauge 6 is secured to the linear portion 1B of the main frame 1 and has a needle 6A for indicating a large dimension and a needle 6B for indicating a small dimension.

Further, the spindle 3 is formed with another rack 3B for the linear driving and is located at a position on the outer peripheral surface varied from that of the rack 3A by 90°. On the other hand, the main frame 1 is provided on the linear portion 1B thereof with a pinion shaft 7 perpendicularly intersecting the spindle 3, and a driving gear 7A is integrally formed on the central portion of this pinion shaft 7, which is meshed with the rack 3B. Furthermore, one end of the pinion shaft 7 is rotatably supported by the main frame 1 through a bush 8, and is made axially unmovable by a set-screw 7B threaded into one end of the pinion shaft 7. Further, integrally formed on the other end of the pinion shaft 7 are threads 9, which are threadably coupled to a rotary knob 10. Confined between the rotary knob 10 and the driving gear 7A of the pinion shaft 7 is a coil spring 11 as being a resilient member, and this coil spring 11 is secured at one end thereof to an end face of the driving gear 7A and at the other end thereof to the rotary knob 10. Additionally, provided at a portion of the rotary knob 10 is an abutting surface 10A, which is adapted to abut against the main frame 1 when a relative rotation occurs between the rotary knob 10 and the threads 9 of the pinion shaft 7, whereby the rotary knob 10 is axially moved by the threads 9 against the coil spring 11.

Here, the rack 3B, the pinion shaft 7 having the driving gear 7A, the bush 8, the rotary knob 10 and the coil spring 11 cooperate to achieve the constant pressure function for the measuring pressure, while the threads 9 of the pinion shaft 7, the rotary knob 10 and the abutting surface 10A of the rotary knob 10 cooperate to achieve the locking function. The both groups of members as described above constitute a constant pressure locking device.

Description will hereunder be given of a method of using the first embodiment of the micrometer.

The rotary knob 10 projectingly provided on the main frame 1 is rotated in the counterclockwise direction as viewed from below in FIG. 1, whereby the spindle 3 is moved to the right in the drawing, so that an interval between the anvil 2 and the tip 4 can be widely opened. After the workpiece, not shown, is set within this interval, if the rotary knob 10 is rotated in a direction opposite to the above, i.e., the clockwise direction, then the spindle 3 is moved towards the anvil 2, i.e., to the left in the drawing, so that the tip 4 can be abutted against the workpiece.

Until the tip 4 is abutted against the workpiece, a turning force of the rotary knob 10 is imparted to the pinion shaft 7 by the coil spring 11 engaged at one end thereof with the rotary knob 10 and at the other end thereof with the driving gear 7A so as to move the rack 3B, i.e., the spindle 3. However, when the tip 4 is abutted against the workpiece, the pinion shaft 7 becomes unrotatable. If the turning force is further applied to the rotary knob 10, then only the rotary knob 10 is rotated against the force of the coil spring 11, whereby the value of distortion resistance of the coil spring 11 acts as the measuring pressure. At this time, the rotary knob 10 threadably coupled to the threads 9 formed on one end portion of the pinion shaft 7 is moved in the axial direction thereof, whereby the abutting surface 10A of the rotary knob 10 is pushed against the main frame 1. This leads to a condition where the rotary knob 10 is tightened to the threads 9 of the pinion shaft 7 erected on the main frame 1. Under this condition, even if one hand is released from the rotary knob 10, the rotary knob 10 is locked by a frictional force of the abutting surface 10A and not turned back.

More specifically, the coil spring 11 functions to render a torque of a predetermined value between the rotary knob 10 and the pinion shaft 7, so that the measuring pressure can be made constant. Further, the rotary knob 10 threadably coupled to the pinion shaft 7 and abutted against the main frame 1 acts as a locking function.

When the dial gauge 6 is read under the above-described condition, dimensions of the workpiece including thickness and the like can be determined.

After the measurement is completed, if the rotary knob 10 is turned in the counterclockwise direction to separate the abutting surface 10A of the rotary knob 10 from the main frame 1, and further, the pinion shaft 7 is rotated to move the spindle 3 to the right in the drawing, then the workpiece is removed, so that the preparation for the succeeding measurement can be ready.

In the present embodiment, the constant pressure locking device having both the constant pressure function and the locking function is incorporated in the rotary knob portion for performing the ordinary measuring operation without providing any special constant pressure device or locking device completely independent of the rotary knob 10, and hence, a mere operation of moving the spindle 3 in measuring operation makes it possible to make the measuring pressure to be constant and effect locking. Further, no special operation is required for unlocking. A mere rotation of the rotary knob 10 in a direction of separating the spindle 3 makes it possible to unlock, and, if the rotary knob 10 is continued to be rotated, then the spindle 3 can be moved.

As has been described hereinabove, in the present embodiment, it is possible to make the micrometer, wherein the spindle 3 is transferred linearly at high speed, to have the controllability and the constant pressure locking function equivalent to those of the conventional thread micrometer. Furthermore, the simplified construction thereof makes it possible to provide the micrometer at a low cost.

Figure 3:
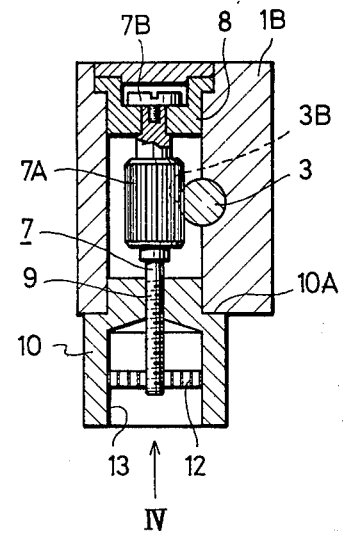
FIG. 3 is a enlarged sectional view showing a second embodiment of the present invention across a section identical with that in FIG. 2.
Figure 4:
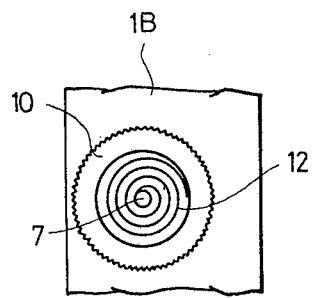
FIG. 4 is a enlarged sectional view in the direction indicated by an arrow of IV in FIG. 3.

In the first embodiment, the coil spring 11 has been used as the resilient member engaged at one end thereof with the rotary knob 10 and at the other end thereof with the pinion shaft 7, but this may be replaced by a spring having a construction in which a spiral spring 12 is connected to an end portion of the pinion shaft 7 and to the inner peripheral surface of a recess 13 formed in the rotary knob 10 as in the second embodiment shown in FIGS. 3 and 4.

In this case, such advantages can be add that the spiral spring 12 is replaceable without detaching the rotary knob 10 to facilitate maintenance, and a spiral spring having the optimum spring constant is selectable for mounting at the time of assembling.

Additionally, in this second embodiment, if a spring locking member whose position is adjustable is provided between the intermediate portion of the spiral spring 12 and the rotary knob 10, then the spring constant of the spiral spring 12 can be suitably set by moving the spring locking member.

Figure 5:
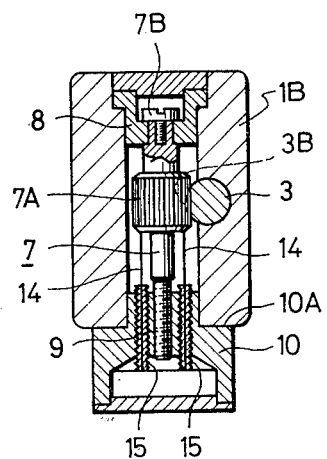
FIG. 5 is a sectional view showing the essential portions of a third embodiment of the present invention.

Further, FIG. 5 shows the third embodiment of the present invention, in which linear springs 14 formed of mere piano wires or the like are used as the resilient member, and further, the spring constant can be changed, i.e., the measuring pressure can be adjusted from outside.

In FIG. 5, a plurality of linear springs 14 formed of piano wires or the like are arranged along the outer periphery of the pinion shaft 7 as centered thereabout between the rotary knob 10 and the pinion shaft 7. Respective ends of the linear springs 14 are engaged with the end face of the driving gear 7A of the pinion shaft 7 and the other ends thereof are inserted into a plurality of adjusting screws 15 provided on the rotary knob 10 in opposed relations to the linear springs 14. The linear springs 14 are made axially slidable relative to the adjusting screws 15, which are threadably coupled to the rotary knob 10. If the adjusting screws 15 are rotated from outside, then the linear spring 14 can be moved in the axial direction of the pinion shaft 7.

Further, the movement of the adjusting screws 15 makes it possible that lengths of portions of the linear springs 14 projecting from the adjusting screws 15 are varied to make the spring constants of the linear springs 14 variable and make the pressure of the spindle 3 abutting the workpiece, i.e., the measuring pressure variable as well.

In the present embodiment, rotation of the adjusting screws 15 makes it possible that the spring constants are variable without replacing the linear springs 14 by new ones, so that the optimum measuring pressure can be set simply and with high accuracy.

Furthermore, in the present embodiment, the linear springs 14 are rotatably and axially unmovably secured to the adjusting screws 15, whereby the adjusting screws 15 are rotated to vary the tensions of the linear springs 14, so that the spring constants may be changed.

Figure 6:
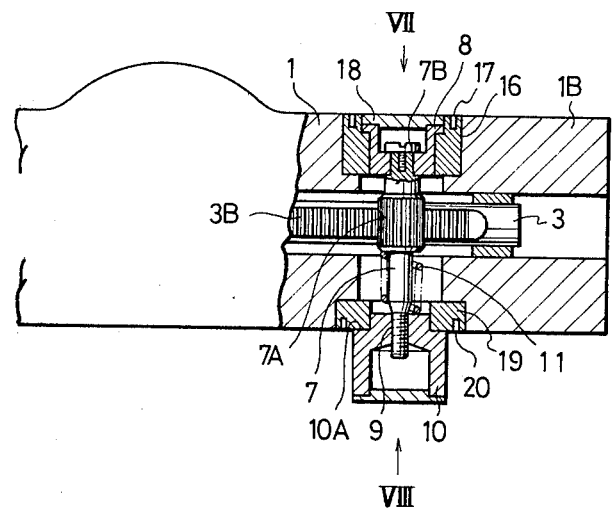
FIG. 6 is a sectional front view showing the essential portions of a fourth embodiment of the present invention, in which a backlash adjusting mechanism is added to the embodiment shown in FIG. 1.
Figure 7:
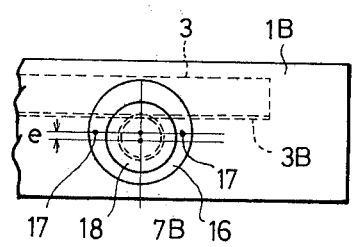
FIG. 7 is a plan view in the direction indicated by an arrow of VII in FIG. 6.
Figure 8:
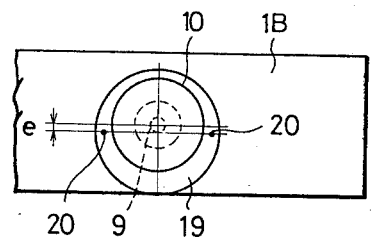
FIG. 8 is a bottom view in the direction indicated by an arrow of VIII in FIG. 6.

FIGS. 6 through 8 show the fourth embodiment of the present invention, in which an example of a backlash adjusting mechanism for adjusting the backlash in the meshing engagement between the driving gear 7A and the rack 3B of the spindle 3 is added to the embodiment shown in FIG. 1.

Here, same reference numerals as shown in the first embodiment are used to designate same or similar parts in the present embodiment, so that detailed description thereof will be omitted.

In these drawings, the bush 8 for rotatably and axially unmovably supporting the pinion shaft 7 in cooperation with the set-screw 7A is held at the outer peripheral portion thereof by an eccentric ring 16 formed in such a manner that the inner diameter and the outer diameter thereof are formed with an eccentricity of a predetermined value therebetween, and the outer periphery of this eccentric ring 16 is rotatably guided by the main frame 1. Two turning holes 17 are formed at the end face of this eccentric ring 16, and pins, not shown, and the like are engaged with these turning holes 17, so that the eccentric ring 16 can be rotated. Additionally, the bush 8 is locked against dislodging by a cover 18.

On the other hand, similarly to the bush 8, the rotary knob 10 is held at the outer peripheral portion thereof, which is held by the main frame 1, by an eccentric ring 19, which is rotatably guided by the main frame 1. Turning holes 20 are formed at the end face of this eccentric ring 19 as well.

As shown in FIGS. 7 and 8, in each of the eccentric rings 16 and 19, the inner diameter and the outer diameter are eccentrical by a value e with each other, whereby, when these eccentric rings 16 and 19 are rotated, the bush 8 and the axis of the rotary knob 10, which are guided by the inner diametral surface, i.e., the axial position of the pinion shaft 7 can be adjusted relative to the rack 3B. In other words, the optimum backlash can be obtained between the rack 3B and the driving gear 7A of the pinion shaft 7, thereby enabling to provide a micrometer with high accuracy.

Addition of the backlash adjusting mechanism of the present embodiment to the first embodiment makes it possible to provide the micrometer with high accuracy, in which a locking mechanism having a constant measuring pressure is provided and a rotational play based on the backlash between the driving gear 7A and the rack 3B is small.

Figure 9:
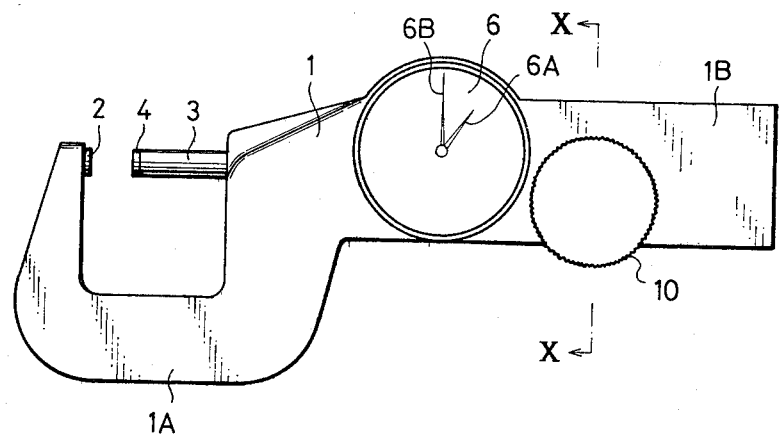
FIG. 9 is a front view showing a fifth embodiment of the present invention.
Figure 10:
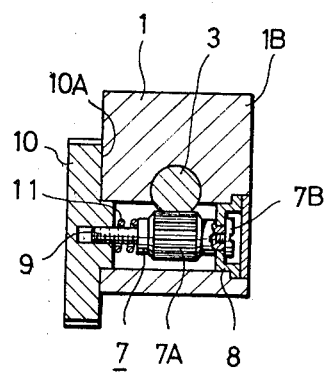
FIG. 10 is a sectional view taken along the line X—X in FIG. 9.

In each of the embodiments described above, the rotary knob 10 is provided on the undersurface of the main frame 1 and the pinion shaft 7 is vertically disposed, however, as in the fifth embodiment shown in FIGS. 9 and 10, it is also possible that the rotary knob 10 is provided close to the lower end of the side surface of the main frame 1 and the pinion shaft 7 is disposed horizontally.

Here, the parts in the present embodiment are similar to those in the first embodiment shown in FIGS. 1 and 2, so that description thereof will be omitted. The major difference of the present embodiment from the first embodiment is in that, in the first embodiment, the abutting surface 10A of the rotary knob 10 abuts against the undersurface of the main frame 1, whereas, in the present embodiment, the abutting surface 10A abuts against the side surface of the eccentric ring 19, and the direction of disposition of the rotary knob 10 differs by 90° from that in the first embodiment. All other respects in arrangement are identical with each other.

In the present embodiment, if the inner surface of a thumb is put to the outer periphery of the rotary knob 10 and the main frame 1 is held by a palm and four fingers except the thumb, then measuring operation can be effected with a left hand being free, that is, a one hand operation of the measuring instrument can be achieved.

In each of the above-described embodiments, the indicator should not necessarily be limited to the dial gauge 6, but, may be replaced by any other member such as a counter or a digitally indicating type electric indicator. Furthermore, in each of the embodiments described above, such an arrangement may be adopted that an idle gear is interposed between the rack 3B of the spindle 3 and the driving gear 7A of the pinion shaft 7, the directions of linear movement of the spindle 3 in accordance with rotation of the pinion shaft 7 may be reversed to those in the above-described embodiments. If it is arranged in this way, the rotational direction of the pinion shaft 7, i.e., the rotary knob 10 and the moving direction of the spindle 3 can fit with each other, so that the operation can be facilitated. In this case, if the rack 3B of the spindle 3 is provided on the rear surface contrary to the illustration in FIG. 1, i.e., in the right in FIGS. 2 and 3 instead of providing the idle gear, and the driving gear 7A is brought into meshing engagement with the rack 3B, then the same operation may be obtained.

Figure 11:
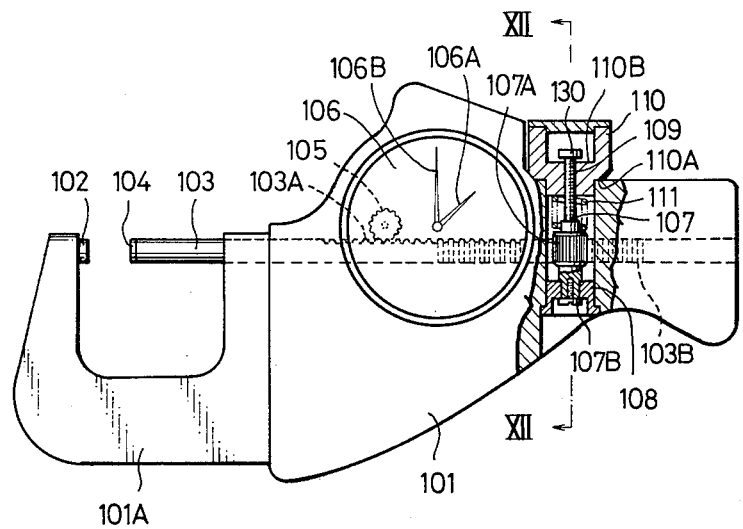
FIG. 11 is a partially cut-away front view showing a sixth embodiment of the present invention.
Figure 12:
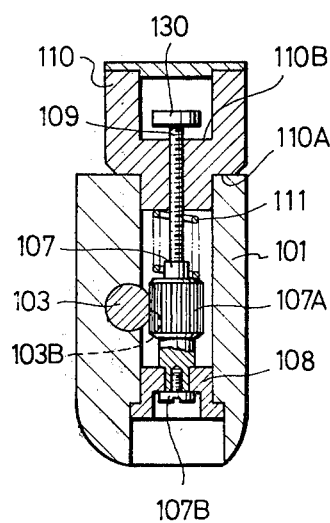
FIG. 12 is a sectional view taken along the line XII—XII in FIG. 11.

FIGS. 11 and 12 show the sixth embodiment of the present invention. In FIG. 11, one end of a substantially grip-like main frame 101 is formed into a U shape, and an anvil 102 is affixed to the inner surface of one side of an opening of the U-shaped portion 101A. The other end of the main frame 101 extends outwardly from the other side of the opening of the U-shaped portion 101A, and a spindle 103 is slidably inserted through the main frame 101 in the longitudinal direction thereof.

An ultra high hardness tip 104 capable of abutting against the anvil 102 is integrally affixed to one end of the spindle 103, and a rack 103A finished with precision is formed on the peripheral surface of the intermediate portion of the spindle 103 over a predetermined range in the axial direction thereof. This rack 103A is meshed with a pinion 105, to which is connected a dial gauge 106 as being an indicator through an interlocking gear mechanism, not shown. This dial gauge 106 is secured to the main frame 101 and has a needle 106A for indicating a large dimension and a needle 106B for indicating a small dimension.

Further, the spindle 103 is provided on a surface thereof differing through 90° from the rack 103A with another rack 103B for the linear driving. On the other hand, the main frame 101 is provided therein with a pinion shaft 107 perpendicularly intersecting the spindle 103, a driving gear 107A is integrally formed at the central portion of this pinion shaft 107, and this driving gear 107A is meshed with the rack 103B. Additionally, one end of the pinion shaft 107 is rotatably supported by the main frame 101 through a bush 108, and the pinion shaft 107 is made axially unmovable by means of a setscrew 107B threadably coupled into one end of the pinion shaft 107. Further, integrally formed on the other end of the pinion shaft 107 are threads 109, to which is threadably coupled a rotary knob 110.

Confined between the rotary knob 110 and the driving gear 107A of the pinion shaft 107 is a coil spring 111 as being a resilient member, which is affixed at one end thereto to an end face of the driving gear 107A and at the other end thereof to the rotary knob 110.

The rotary knob 110 is provided at a portion thereof with an abutting surface 110A, which is adapted to abut against the main frame 101 when a relative rotation occurs between the rotary knob 110 and the threads 109 of the pinion shaft 107 whereby the rotary knob 110 is moved by the threads 109 against the coil spring 111 in the axial direction thereof towards the driving gear 107A.

The pinion shaft 107 is projected from the inner surface 110B of the rotary knob 110 by a predetermined length, and an engaging member 130 is mounted on the projected portion in a manner to have a gap of a predetermined value between the inner surface 110B and itself and be displaceable in mounted position thereof. The engaging member 130 is adapted to abut against the inner surface 110B when a relative rotation occurs between the rotary knob 110 and the threads 109 of the pinion shaft 107 whereby the rotary knob 110 is moved in a direction of being separated from the driving gear 107A, and the inner surface 110B and the engaging member 130 constitute an integrating device for integrally rotating the rotary knob 110 and the pinion shaft 107 when the spindle 103 is retracted.

Furthermore, the rack 103B, the pinion shaft 107 having the driving gear 107A, the bush 108, the rotary knob 110 and the coil spring 111 cooperate to achieve the constant pressure function for the measuring pressure, while the threads 109 of the pinion shaft 107, the rotary knob 110 and the abutting surface 110A of the rotary knob 110 cooperate to achieve the locking function. The both groups of members as described above constitute a constant pressure locking device.

Description will hereunder be given of a method of using the present embodiment.

The rotary knob 110 projectingly provided on the main frame 101 is rotated in the clockwise direction as viewed from above in FIG. 11, whereby the spindle 103 is moved to the right in the drawing, so that an interval between the anvil 102 and the tip 104 can be widely opened. After the workpiece, not shown, is set within this interval, if the rotary knob 110 is rotated in a direction opposite to the above, i.e., the counterclockwise direction, then the spindle 103 is moved towards the anvil 102, i.e., to the left in the drawing, so that the tip 104 can be abutted against the workpiece.

Until the tip 104 is abutted against the workpiece, a turning force of the rotary knob 110 is imparted to the pinion shaft 107 by the coil spring 111 engaged at one end thereof with the rotary knob 110 and at the other end thereof with the driving gear 107A so as to move the rack 103B, i.e., the spindle 103. However, when the tip 104 is abutted against the workpiece, the pinion shaft 107 becomes unrotatable. If the turning force is further applied to the rotary knob 110, then only the rotary knob 110 is rotated against the force of the coil spring 111, whereby the value of distortion resistance of the coil spring 111 acts as the measuring pressure. If, as the coil spring 111, a weak one is adopted, then the measuring pressure comes to be a weak one, and, even if the workpiece is made of a soft material such as a synthetic resin material, a high precision measurement can be attained without distorting the workpiece. At this time, the rotary knob 110 threadably coupled to the threads 109 formed at one end of the pinion shaft 107 is moved in the axial direction thereof, whereby the abutting surface 110A of the rotary knob 110 is pushed against the main frame 101. This leads to a condition where the rotary knob 110 is tightened to the threads 109 of the pinion shaft 107 erected on the main frame 101. Under this condition, even if one hand is released from the rotary knob 110, the rotary knob 110 is locked by a frictional force of the abutting surface 110A and not turned back.

More specifically, the coil spring 111 functions to render a torque of a predetermined value between the rotary knob 110 and the pinion shaft 107, so that the measuring pressure can be made constant. Further, the rotary knob 110 threadably coupled to the pinion shaft 107 and abutted against the main frame 101 acts as a locking function.

When the dial gauge 106 is read under the above-described condition, dimensions of the workpiece including thickness and the like can be determined.

After the measurement is completed, if the rotary knob 110 is turned in the clockwise direction to separate the abutting surface 110A of the rotary knob 110 from the main frame 101, then the locking function is released, and immediately thereafter, the inner surface 110B of the rotary knob 110 and the engaging member 130, which constitute the integrating device, abut against each other, so that the rotary knob 110 and the pinion shaft 107 can be rotated integrally. Thus, the spindle 103 is moved to the right in the drawing, whereby the workpiece is removed, so that the preparation for the succeeding measurement can be ready.

The following advantages can be offered by the present embodiment described above.

The constant pressure locking device having both the constant pressure function and the locking function is incorporated in the rotary knob portion for performing the ordinary measuring operation without providing any special constant pressure device or locking device completely independent of the rotary knob 110, and hence, a mere operation of moving the spindle 103 in measuring operation makes it possible to make the measuring pressure to be constant and effect locking. Further, no special operation is required for unlocking. A mere rotation of the rotary knob 110 in a direction of separating the spindle 103 makes it possible to unlock, and, if the rotary knob 110 is continued to be rotated by a predetermined value, then the inner surface 110B of the rotary knob 110 and the engaging member 130 abut against each other, i.e., the integrating device operates to integrate the pinion shaft 107 with the rotary knob 110. Hence, even if the coil spring 111 is made very weak, the spindle 103 can be immediately retracted with a value of rotational play of the rotary knob 110 being made very small. In consequence, the micrometer has a very high controllability and can be quickly operated by one hand no matter whether the measuring pressure is large or small.

Furthermore, the presence of the engaging member 130 provided on the pinion shaft 107 makes it possible to eliminate a possiblity that the rotary knob 110 accidentally falls off the main frame 101.

Further, the spindle 103 is transferred by rack-feed, so that the spindle 103 can be transferred by far faster than in the case of using a spiral groove, and a constant and very small measuring pressure can be obtained with loosenesses as seen with the conventional thread type micrometer being eliminated.

Moreover, the engaging member 130 is provided on the pinion shaft 107 in a manner to be displaceable in mounted position thereof, whereby a suitable measuring pressure can be selected through the adjustment of a gap between the engaging member 130 and the inner surface 110B of the rotary knob 110. Additionally, even if the engaging member 130 is non-displaceably mounted, a desirable measuring pressure can be set only if the gap between the engaging member 130 and the inner surface 110B is adjusted with the engaging member being replaced one of various types. At the same time as above, even if the rotating speed of the rotary knob 110 is made very low, the spindle 103 can be advanced or retracted over a satisfactorily long range, thereby enabling to materialize a micrometer operable by one hand.

Furthermore, the simplified construction makes it possible to provide the micrometer at a low cost.

Figure 13:
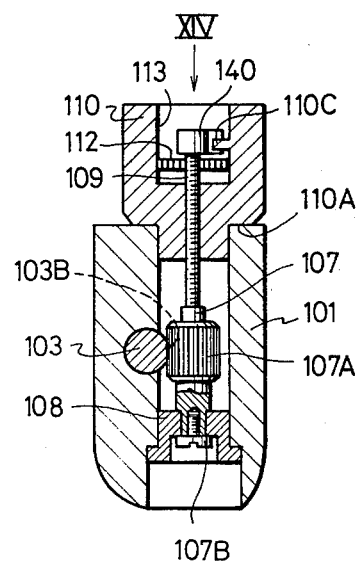
FIG. 13 is a sectional view showing a seventh embodiment of the present invention across a section identical with that in FIG. 12.
Figure 14:
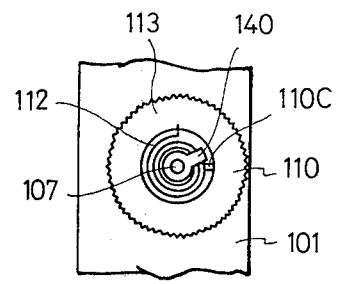
FIG. 14 is a enlarged top view in the direction indicated by an arrow of XIV in FIG. 13.

In the above-described sixth embodiment, the coil spring 111 has been used as the resilient member engaged at one end thereof with the rotary knob 110 and at the other end thereof with the pinion shaft 107, but this may be replaced by a spring having a construction in which a spiral spring 112 is connected to an end portion of the pinion shaft 107 and to the inner peripheral surface of a recess 113 formed in the rotary knob 110 as in the seventh embodiment shown in FIGS. 13 and 14.

In this case, the integrating device is constituted by an engageable piece 140 formed on the pinion shaft 107 and a projection 110C provided on the rotary knob 110 and adapted to abut the engageable piece 140 when the rotary knob 110 is rotated in the counterclockwise direction to unlock the spindle 103, and further, retracted.

This seventh embodiment can add the advantages that the spiral spring 112 can be replaced with new one without detaching the rotary knob 110, whereby the maintenance is facilitated, and further, a spiral spring having the optimum spring constant can be selected and mounted in assembling. The provision of a spring locking member adjustable in its position between the intermediate portion of the spiral spring 112 and the rotary knob 110 makes it possible to move this spring locking member, so that the spring constant of the spiral spring 112 can be suitably set.

Figure 15:
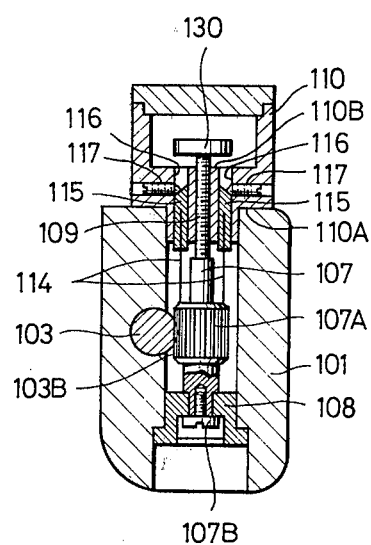
FIG. 15 is a sectional view showing the essential portions of an eighth embodiment of the present invention.

Further, FIG. 15 shows the eighth embodiment of the present invention, in which linear springs 114 formed of mere piano wires or the like are used as the resilient member, and further, the spring constant can be changed, i.e., the measuring pressure can be adjusted from outside.

In FIG. 15, a plurality of linear springs 114 formed of piano wires or the like are arranged along the outer periphery of the pinion shaft 107 as centered thereabout between the rotary knob 110 and the pinion shaft 107. Respective ends of the linear springs 114 are engaged with the end face of the driving gear 107A of the pinion shaft 107 and the other ends thereof are inserted into a plurality of adjusting pins 115 provided on the rotary knob 110 in opposed relations to the linear springs 114.

These adjusting pins 115 are inserted into sliding holes 116 in a manner to be slidable in the axial lines thereof, and the adjusting pins 115 are provided at the upper end portions thereof in the drawing with tapered surfaces, against which are abutted the forward ends of the adjusting screws 117. The adjusting screws 117 are threadably coupled to the rotary knob 110. If the adjusting screws 117 are rotated from outside, then the adjusting pins 115 can be moved in the axial direction of the pinion shaft 107.

Here, the adjusting pins 115, the sliding holes 116 and the adjusting screws 117 constitute an adjusting mechanism, and the adjusting pins 115 of this adjusting mechanism are moved, whereby lengths of portions of the linear springs 114 projecting from the adjusting pins 115 are changed to make the linear springs 114 variable in spring constant and further to make a force of the spindle 103 abutting against the workpiece variable.

In the present embodiment, the adjusting pins 115 are rotated so that the spring constants thereof can be changed, without replacing the linear springs 114 with new ones, thus enabling to readily set the optimum measuring pressure.

Furthermore, in the sixth embodiment, the value of displacement of the spindle 103 is indicated by the dial gauge 106 as being the indicator by way of the pinion 105 and the gear mechanism connected to the pinion 105, however, this construction may be replaced by one, in which the gear mechanism is not adopted and the indication is digitally effected by a photo-electric encoder, a magnetic encoder or the like.

Further, in ech of the above-described embodiments, the present invention has been applied to a micrometer, however, the application should not necessarily be limited to a micrometer, but to all of the instruments for measuring a length of a workpiece by a value of displacement of a spindle.

As has been described hereinabove, the present invention can offer the advantage of providing an instrument for measuring a length, provided with a constant pressure locking device being excellent in controllability.

What is claimed is:

1. An instrument for measuring a length, comprising:
   a main frame means which includes an anvil and elongated guide means, the axis of which is aligned with said anvil;
   an elongated spindle linearly movable in the axial direction of said elongated guide means, said spindle having means defining a rack thereon;
   length indicating gauge means responsive to an axial movement of said spindle;
   a pinion shaft and means rotatably mounting said pinion shaft on said main frame means, said pinion shaft having a driving gear thereon engaged with said rack so that a rotation of said pinion shaft will effect an axial movement of said spindle, said pinion shaft further having a threaded segment thereon;
   a rotary knob rotatably mounted on said main frame means and having means thereon threadedly engaging said threaded segment of said pinion shaft;
   resilient means for yieldably resisting relative rotation between said pinion shaft and said rotary knob so that a rotation of said rotary knob will effect a rotation of said pinion shaft and a consequent axial movement of said spindle, said resilient means yielding and permitting the aforesaid relative movement in response to a resistance to axial movement being applied to said spindle; and
   releasable locking means interposed between said rotary knob and said main frame means and being activated in response to a relative rotation between said pinion shaft and said rotary knob for locking said rotary knob against rotation and, consequently locking said spindle in a fixed position whereby when said spindle engages an object to be measured oriented in the path of movement of said spindle toward said anvil, said rotary knob will rotate relative to said pinion shaft and said releasable locking means will effect a fixing of the position of said spindle to thereby enable a visual inspection of said gauge means without inadvertantly shifting the position of said spindle and the consequent altering of the indication on said gauge means.

2. An instrument for measuring a length as set forth in claim 1, wherein adjusting means is provided for facilitating a manual adjustment of the spring constant of said resilient means from a location outside of said main frame means.

3. An instrument for measuring a length as set forth in claim 1, or claim 2, wherein said resilient means is a coil spring.

4. An instrument for measuring a length as set forth in claim 1 or claim 2, wherein said resilient means is a spiral spring.

5. An instrument for measuring a length as set forth in claim 1 or claim 2, wherein said resilient means includes plural linear springs.

6. An instrument for measuring a length as set forth in claim 1, wherein said releasable locking means includes a first surface on said main frame means and a second surface on said rotary knob opposing said first surface, said second surface moving toward said first surface in response to a relative movement occurring between said rotary knob and said threaded segment on said pinion shaft to cause said rotary knob to move axially toward said main frame means to bring said first and second surfaces into frictional engagement.

7. An instrument for measuring a length as set forth in claim 6, wherein said resilient means is a coil spring which extends between said driving gear and said rotary knob and continually applies a force urging said rotary knob away from said driving gear.

8. An instrument for measuring a length as set forth in claim 6, wherein said resilient means is a spiral spring one end of which is connected to said rotary knob and the other end is connected to said threaded segment on said pinion shaft and continually applies a force resisting relative rotation between said rotary knob and said pinion shaft.

9. An instrument for measuring a length as set foth in claim 1, wherein said resilient means includes integrating means on said threaded segment of said pinion shaft for effecting a driving and nonrelative rotative connection of said threaded segment to said rotary knob following an initial relative rotative and axial movement between said rotary knob and said threaded segment effecting a movement of said spindle away from said anvil and said object to be measured.

\* \* \* \* \*